(12) United States Patent  
Suzuki et al.

(10) Patent No.: US 9,343,913 B2
(45) Date of Patent: May 17, 2016

(54) POWER CHARGING DEVICE AND MOBILE TERMINAL APPARATUS

(71) Applicant: Sony Mobile Communications Inc., Tokyo (JP)

(72) Inventors: Katsuya Suzuki, Gunma (JP); Kuniharu Suzuki, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/698,259

(22) Filed: Apr. 28, 2015

(65) Prior Publication Data

US 2015/0244188 A1    Aug. 27, 2015

Related U.S. Application Data

(62) Division of application No. 13/408,531, filed on Feb. 29, 2012.

(60) Provisional application No. 61/452,800, filed on Mar. 15, 2011.

(51) Int. Cl.
*H02J 7/00* (2006.01)
*H02J 7/02* (2006.01)

(52) U.S. Cl.
CPC ............. *H02J 7/0013* (2013.01); *H02J 7/0006* (2013.01); *H02J 7/0044* (2013.01); *H02J 7/025* (2013.01); *H02J 7/0021* (2013.01)

(58) Field of Classification Search
CPC ........................................................ H02J 7/0011
USPC .......................................................... 320/106
See application file for complete search history.

(56) References Cited

U.S. PATENT DOCUMENTS

2010/0201306 A1* 8/2010 Kazama ................... G06F 1/26
320/106
2011/0248683 A1* 10/2011 Young ................... B60L 11/005
320/137

FOREIGN PATENT DOCUMENTS

JP        2006-049331        2/2006

* cited by examiner

*Primary Examiner* — Edward Tso
*Assistant Examiner* — Ahmed Omar
(74) *Attorney, Agent, or Firm* — Oblon, McClelland, Maier & Neustadt, L.L.P.

(57) ABSTRACT

A charging device that includes a first battery charged at a first rate and a second battery that is charged at a second rate, which is faster than the first rate. The charging device includes an interface that receives electric power from a charger; a first switch disposed between the interface and the first battery; a second switch disposed between the second battery and the first battery; a battery voltage detection circuit that detects a voltage of the second battery; a charger detection circuit connected to the interface that detects whether power is being received from the charger; and a switch control circuit that controls the first switch and the second switch based on outputs of the charger detection circuit and the battery voltage detection circuit.

7 Claims, 17 Drawing Sheets

FIG. 4

| CHARGER | VSBAT | SW205 | SW206 | DC/DC209 |
|---|---|---|---|---|
| CONNECTED | ≤ 4V | OFF | OFF | OFF |
| | > 4V | ON | | |
| DISCONNECTED | ≤ 4V | OFF | ON | ON |
| | > 4V | | | |

FIG. 15

| CHARGER | VSBAT | SW205 | DC/DC 207a | SW206 | DC/DC 209a |
|---|---|---|---|---|---|
| CONNECTED | ≤ 4V | OFF | OFF | OFF | OFF |
| | > 4V | ON | ON | | |
| DISCONNECTED | ≤ 4V | OFF | OFF | ON | ON |
| | > 4V | | | | |

POWER CHARGING DEVICE AND MOBILE TERMINAL APPARATUS

CROSS REFERENCE TO RELATED APPLICATION

This application is a divisional of U.S. Ser. No. 13/408,531, filed Feb. 29, 2012. U.S. Ser. No. 13/408,531 claims the benefit of priority under 35 U.S.C. §119(e) of U.S. Provisional Patent Application Ser. No. 61/452,800 filed on Mar. 15, 2011. The entire contents of which is incorporated herein by reference.

BACKGROUND

1. Technical Field

The present disclosure relates to a charging device for charging a secondary battery in a mobile device and a mobile device including this charging device.

2. Description of Related Art

Currently, the use of mobile phone terminals and mobile information terminals called smartphones is spreading. Each of these mobile devices includes a rechargeable secondary battery (i.e., a rechargeable battery). Although uptime of the mobile devices differs depending on a usage state thereof, the larger a capacity of the secondary battery, the longer the mobile devices can be used. However, the larger the capacity of the secondary battery, the longer it takes for the battery to reach a full charge level.

Thus, users may be unable to perform sufficient charging of the secondary battery in a short period, such as when the users become aware that a remaining battery level of a mobile device is low before going out. The remaining battery level may reach empty at the time of use after the users go out and the users may be unable to use the mobile device.

Japanese Unexamined Patent Application Publication No. 2006-49331 describes a method for preparing a mobile charger/discharger capable of performing boost charge separately from a mobile device. In this method, users charge the mobile charger/discharger at high speed and then carry the mobile charger/discharger with the mobile device. The users attach the mobile charger/discharger to the mobile device at a destination to slowly charge a secondary battery of the mobile device.

SUMMARY

Generally, boost-chargeable energy devices for use in mobile chargers/dischargers have volume energy density smaller than secondary batteries (main body batteries) in mobile devices. Thus, the size of the mobile chargers/dischargers inevitably increases when electric power for fully charging the main body batteries is acquired.

When the mobile chargers/dischargers are kept in the size for satisfying the minimum necessary electric power to avoid this problem, the usage thereof is limited to emergency use. In such a case, since users have to perform charging of the secondary batteries in the mobile devices separately from charging of the mobile chargers/dischargers, inconvenience, such as a need of the respective chargers, is caused.

The present disclosure has been made based on such a background and provides a charging device capable of satisfying both of a demand for boost charging of a mobile device and a demand for a charge capacity and a mobile device adopting this charging device.

According to a first exemplary embodiment, the disclosure is directed to a charging device that includes a first battery charged at a first rate and a second battery that is charged at a second rate, which is faster than the first rate. The charging device includes an interface that receives electric power from a charger; a first switch disposed between the interface and the first battery; a second switch disposed between the second battery and the first battery; a battery voltage detection circuit that detects a voltage of the second battery; a charger detection circuit connected to the interface that detects whether power is being received from the charger; and a switch control circuit that controls the first switch and the second switch based on outputs of the charger detection circuit and the battery voltage detection circuit.

According to another exemplary embodiment, the disclosure is directed to a charging device that is selectively connected to one of a first battery that is charged at a first rate and a second battery that is charged at a second rate, which is faster than the first rate. The charging device including an interface that receives electric power from a charger; a connector that is selectively connected to the first battery or the second battery; a battery identification circuit that determines whether the first or second battery is connected to the connector; and a current limiting circuit disposed between the interface and the connector and that limits a current of power received from the charger to a predetermined value when the battery identification circuit determines that the first battery is connected to the connector.

In accordance with the present disclosure, both of a demand for boost charging of a mobile device and a demand for a charge capacity can be satisfied.

BRIEF DESCRIPTION OF DRAWINGS

FIG. 4 is a diagram representing, as a table, the operation represented by the flowchart of FIG. 3.

FIG. 15 is a diagram representing, as a table, the operation represented by the flowchart of FIG. 11.

DETAILED DESCRIPTION

Embodiments of the present disclosure will be described in detail below with reference to the drawings. Herein, a mobile phone terminal will be described as an example of a mobile device 100.

First Embodiment

Configuration of First Embodiment

First, a configuration of the mobile device 100 according to this embodiment will be described.

Figure 1:
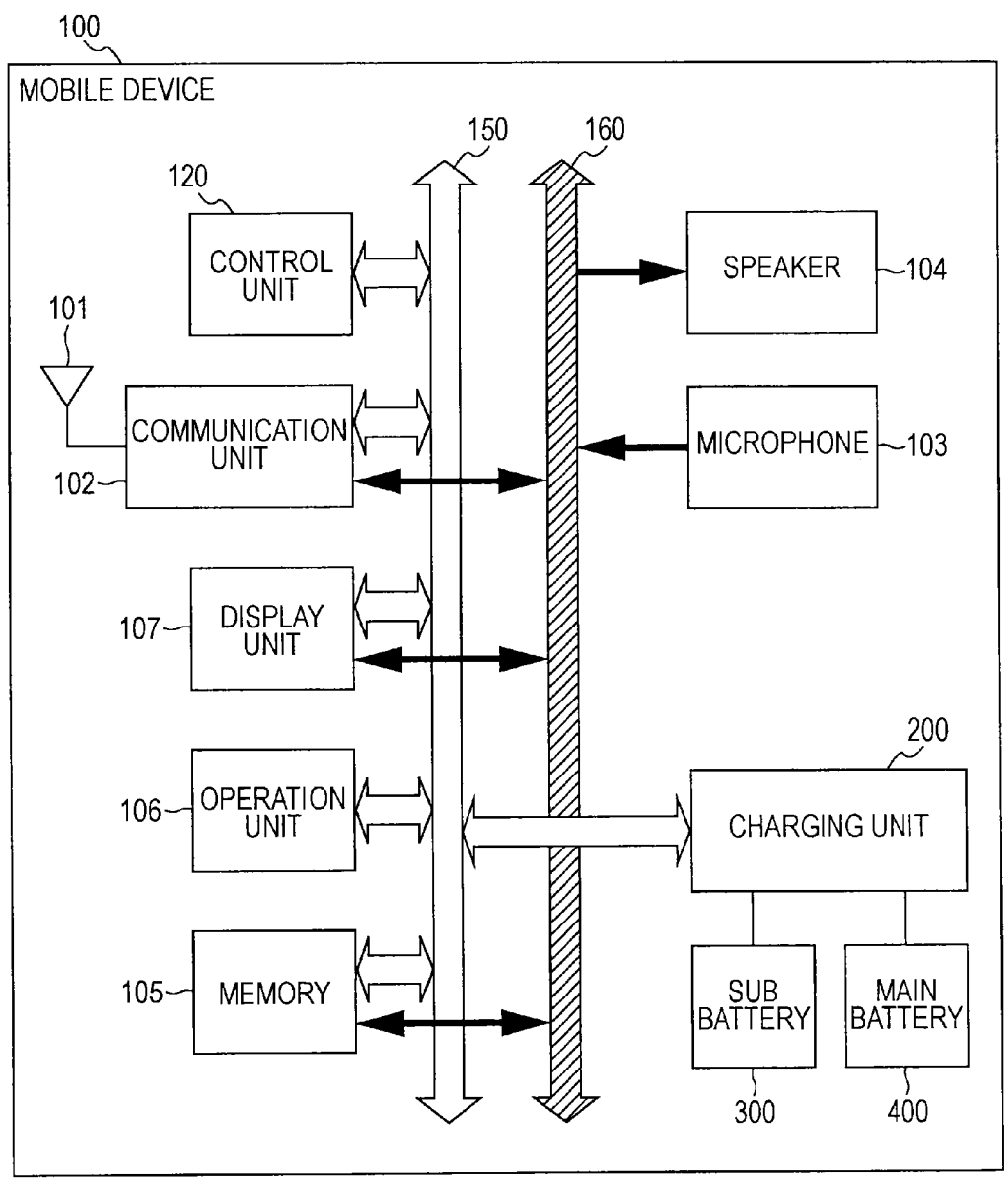
FIG. 1 is a block diagram illustrating a schematic hardware configuration of a mobile device in this embodiment.

FIG. 1 is a block diagram illustrating a schematic hardware configuration of the mobile device 100.

The mobile device 100 includes a control unit 120 that controls the entirety and executes necessary processing. The control unit 120 can be constituted by a known central processing unit (CPU) or the like. The control unit 120 is connected to each unit of the mobile device 100 (herein, a communication unit 102, a memory 105, an operation unit 106, a display unit 107, and a charging unit 200) through a control line 150. The display unit 107, the memory 105, a microphone 103 inputting audio on the mobile device side, and a speaker 104 outputting audio of a person on the other end of the line are connected to the communication circuit 102 through a data line 160.

The communication unit 102 is a part that utilizes an antenna 101 for wireless telephone communication, demodulates a signal received from the antenna 101, and modulates a signal to be sent to the antenna 101.

The memory 105 constitutes a storage unit that stores programs executed by the control unit 120 for operating the mobile device 100, data needed for the execution, and user data, such as a phone book and mail data.

The operation unit 106 is an input device that users use to make a phone call or create a mail.

The display unit 107 is a display device for displaying various kinds of data, such as text, images, and movies, on a display screen.

A main battery 400 is a secondary battery (a first secondary battery) used as a main power source of the mobile device 100 and is, for example, a lithium ion battery or a lithium polymer battery.

A sub battery 300 is a secondary battery (a second secondary battery) that can be charged quicker than the main battery 400 and is, for example, a lithium ion capacitor, a lithium titanate battery, or an olivine-type lithium iron phosphate battery. A capacity of the sub battery 300 is generally smaller than that of the main battery 400. In this embodiment, it is assumed that full charge voltage of the sub battery 300 is lower than that of the main battery 400. More specifically, the voltages are set to be, but are not particularly limited to, 4 V and 4.2 V in this embodiment.

The charging unit 200 is a part that performs charging of the main battery 400 and the sub battery 300 and controls operations thereof.

Figure 2:
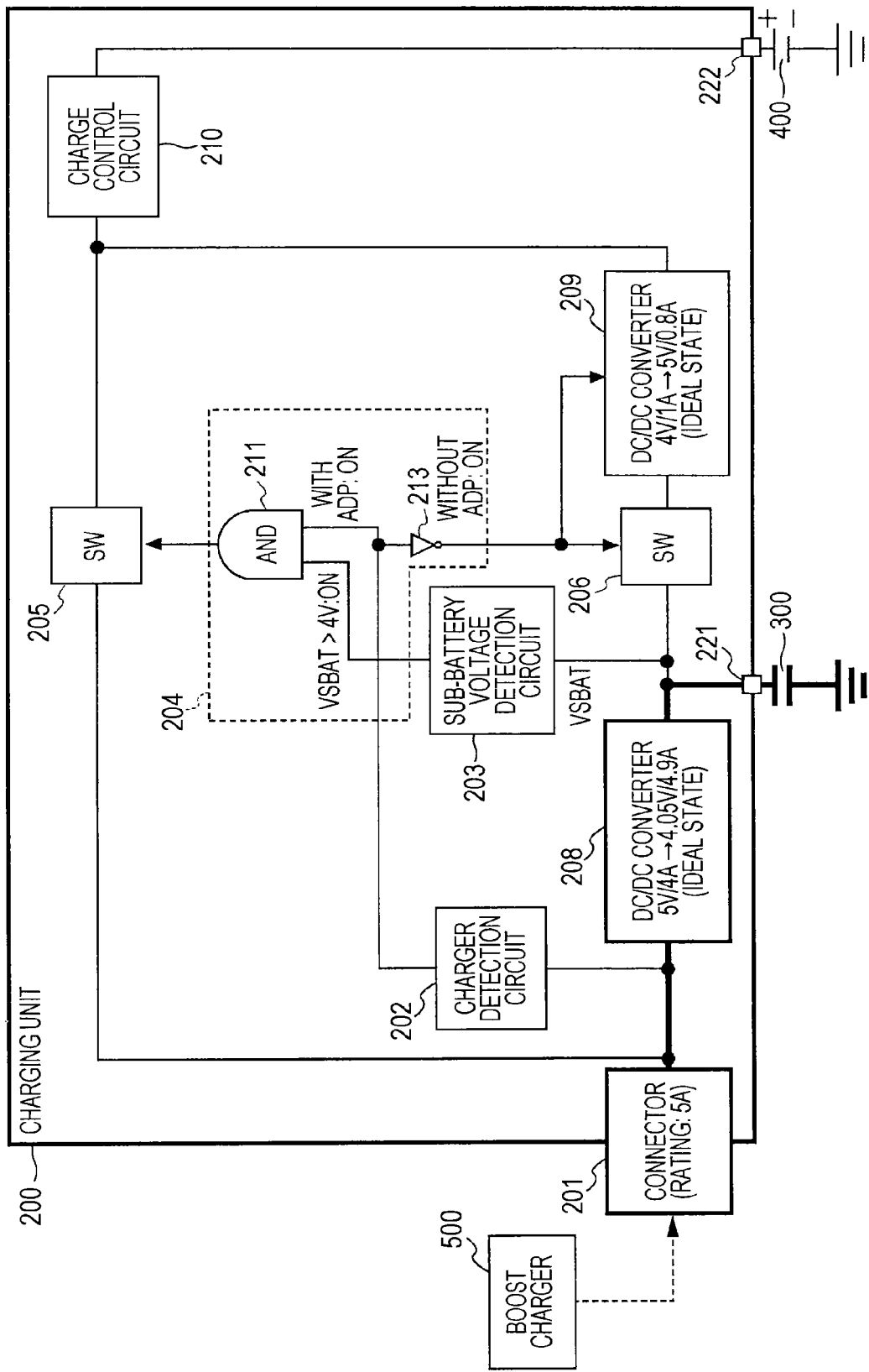
FIG. 2 is a diagram illustrating an example of a configuration of a charging unit in the mobile device illustrated in FIG. 1.

FIG. 2 illustrates an example of a configuration of the charging unit 200 in the mobile device 100 illustrated in FIG. 1.

The charging unit 200 includes a connector 201, a charger detection circuit 202, a sub-battery voltage detection circuit 203, first and second switches SW 205 and 206, first and second DC/DC converters 208 and 209, a charge control circuit 210, an AND circuit 211, and an inverting circuit (an inverter) 213.

A terminal 221 connected to the main battery 400 of the mobile device 100 and a terminal 222 connected to the sub battery 300 intended for boost charge are provided in the charging unit 200.

To perform boost charging of the sub battery 300 intended for boost charge, a connector having a rated current value (5 A in this embodiment) that is larger than a conventional one is adopted as the connector 201 of the charging unit 200.

The charger detection circuit 202 is connected to an output end of the connector 201. The charger detection circuit 202 is a circuit for detecting whether a boost charger 500 is connected to the connector 201 or not (that is, whether the boost charger 500 is in a connected state or not).

The sub-battery voltage detection circuit 203 is connected to one end of the sub battery 300 and detects whether present voltage (VSBAT) of the sub battery 300 is equal to or higher than a threshold.

The first switch SW 205 is a switch for selectively connecting/disconnecting a charge path from the charger to the main battery 400 serving as the first secondary battery. That is, the first switch SW 205 is a switch for switching between whether to perform charging of the main battery 400 from the charger or not.

The second switch SW 206 is a switch for selectively connecting/disconnecting a charge path from the sub battery 300 serving as the second secondary battery to the main battery 400 serving as the first secondary battery. That is, the second switch SW 206 is a switch for switching between whether to perform charging of the main battery 400 from the sub battery 300 or not.

The first DC/DC converter 208 is a step-down DC/DC converter that converts electric power from the charger into an optimum level for performing charging of the sub battery 300. In this example, the first DC/DC converter 208 converts 5 V/4 A into 4.05 V/4.9 A in an ideal state when the boost charger 500 is connected to the connector 201. These voltage and current values of the DC/DC converter are examples of a case of using a lithium ion capacitor.

The second DC/DC converter 209 is a step-up DC/DC converter that converts electric power of the sub battery 300 into an optimum level for performing charging of the main battery 400. In an ideal state of this example, the second DC/DC converter 209 converts 4 V/1 A into 5 V/0.8 A.

The charge control circuit 210 is a circuit that controls charging of the main battery 400. Contents of the control are monitoring of voltage of the main battery 400 (e.g., monitoring of full charge and abnormal voltage), monitoring of current flowing through the main battery 400, and monitoring of temperature, for example.

The AND circuit 211 is a circuit that outputs a control signal of the SW 205 on the basis of a result of logical AND of output of the charger detection circuit 202 and output of the sub-battery voltage detection circuit 203. In the example of this embodiment, the output of the AND circuit 211 is ON if the charger exists (an adapter (ADP) exists) and the sub-battery voltage VSBAT exceeds a predetermined value (4 V here). In this way, the switch SW 205 is connected.

The inverting circuit 213 is a circuit that inverts the output of the charger detection circuit 202 to utilize the inverted signal as a control signal of the switch 206 and the DC/DC converter 209. In this example, the inverting circuit 213 functions to turn ON the switch SW 206 and the DC/DC converter 209 when the charger is not connected (the ADP does not exist).

The AND circuit 211 and the inverting circuit 213 constitute a switch control unit 204 that controls the switches 205 and 206 on the basis of the output of the charger detector 202 and the output of the battery voltage detection circuit 203. This switch control unit 204 may be realized with a hardware circuit or may be realized with software control by the control unit 120 or the like.

Operation of First Embodiment

An operation of the charging unit 200 of FIG. 2 will be described next using FIG. 3.

Figure 3:
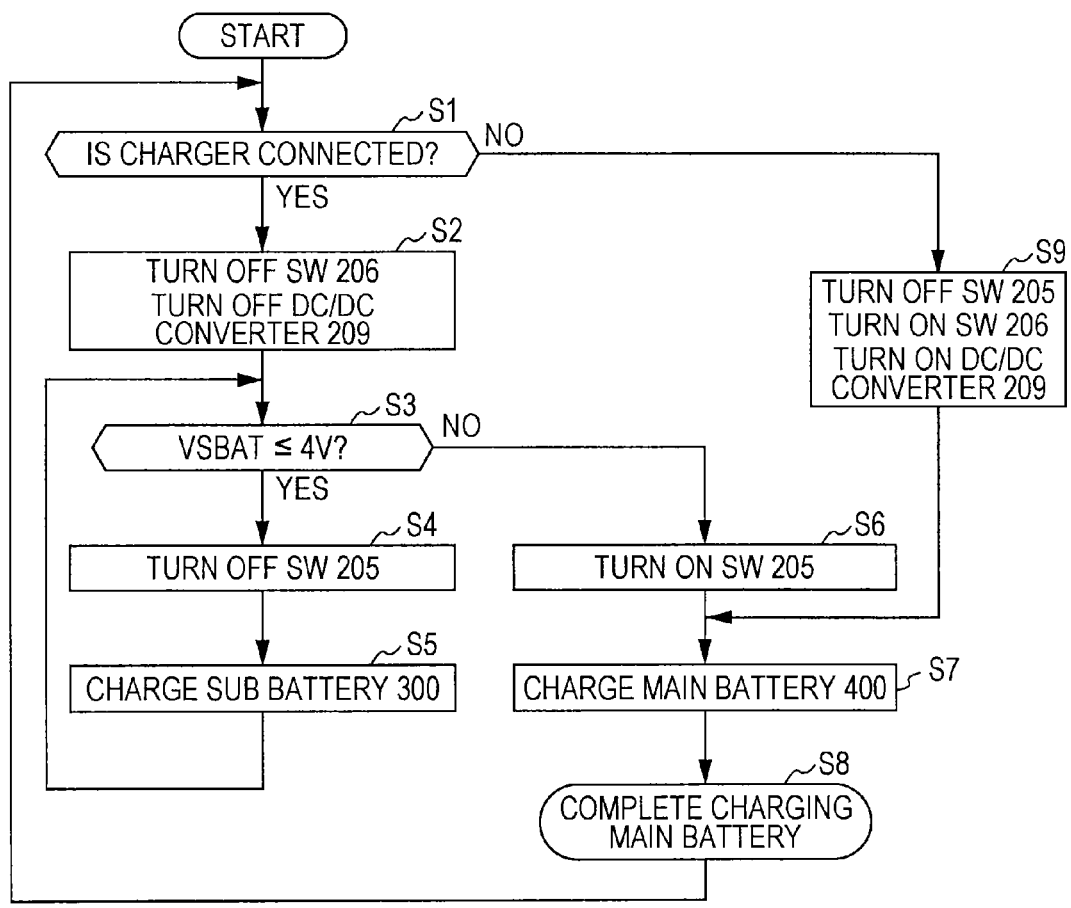
FIG. 3 is a flowchart representing an operation of the charging unit illustrated in FIG. 2.

FIG. 3 is a diagram illustrating the operation of the charging unit 200 as a flowchart.

First, the charger detection circuit 202 confirms whether the charger is connected to the connector 201 or not (S1). If the charger detection circuit 202 detects that the charger is connected (is in the connected state), the inverting circuit 213 provides the inverted output of the charger detection circuit 202. This inverted output turns OFF the SW 206 and the DC/DC converter 209 (S2). As a result, charging of the main battery 400 from the sub battery 300 is prevented.

The sub-battery voltage detection circuit 203 then confirms whether the voltage (VSBAT) of the sub battery 300 is equal to or lower than a predetermined threshold (S3). For example, when a lithium ion capacitor is utilized in the sub battery 300, the sub-battery voltage detection circuit 203 determines a condition of VSBAT 4 V.

When the voltage (VSBAT) of the sub battery 300 is equal to or lower than the threshold, the SW 205 is turned OFF (S4).

As a result, when the voltage of the sub battery 300 is relatively low with the charger being connected, charging of the sub battery 300 from the charger is prioritized. Charging of the sub battery 300 is continued until the voltage (VSBAT) of the sub battery 300 reaches the threshold (S5).

Once the voltage (VSBAT) of the sub battery 300 becomes higher than the threshold thereafter, the SW 205 is turned ON (S6). In this way, charging of the main battery 400 is performed from the charger through the charge control circuit 210 (S7). At this time, charging of the sub battery 300 from the charger is continued in parallel.

After charging of the main battery 400 completes (S8), the process returns to the first step of S1.

If it is determined in step S1 that the charger is not connected to the connector 201, the SW 205 is turned OFF and the SW 206 and the DC/DC converter 209 are turned ON (S9), so that charging of the main battery 400 is performed from the sub battery 300.

FIG. 4 is a diagram representing, as a table, the operation represented by the flowchart of FIG. 3. That is, this table illustrates operation states (ON/OFF) of the switch SW 205, the switch 206, and the DC/DC converter 209 in accordance with presence/absence of the charger and high/low voltage of the sub battery 300.

Advantages of First Embodiment (1) Since the above-described charge control is charge control that prioritizes charging of the sub battery 300 that completes in a short period, users can acquire minimum electric power necessary for the mobile device if the sub battery 300 is charged.

(2) If the charger is removed with charging of the main battery 400 being incomplete after charging of the sub battery 300 completes, charging of the main battery 400 is automatically performed from the sub battery 300. Since the sub battery 300 shifts into a rechargeable state in response to charging of the main battery 400, the users can acquire the minimum necessary electric power in the sub battery 300 in a short period upon connecting the charger again.

(3) When the charger is kept connected after completion of charging of the sub battery 300, charging of the main battery 400 also starts. As a result, since charging of both of the main battery 400 and the sub battery 300 is performed, it can be expected that uptime of the mobile device of the users increases compared with a configuration of the cited literature.

(4) Hitherto, there is a method for preparing a charged backup secondary battery, carrying the battery with a mobile device, and replacing the secondary battery when a remaining battery level drops. In accordance with this embodiment, it is possible to substantially increase a total battery capacity without carrying the backup secondary battery with the mobile device. Additionally, troublesomeness, such as a necessity of a work for charging the backup secondary battery in addition to a work for charging the secondary battery in the mobile device, is eliminated.

Modification of First Embodiment

Figure 5:
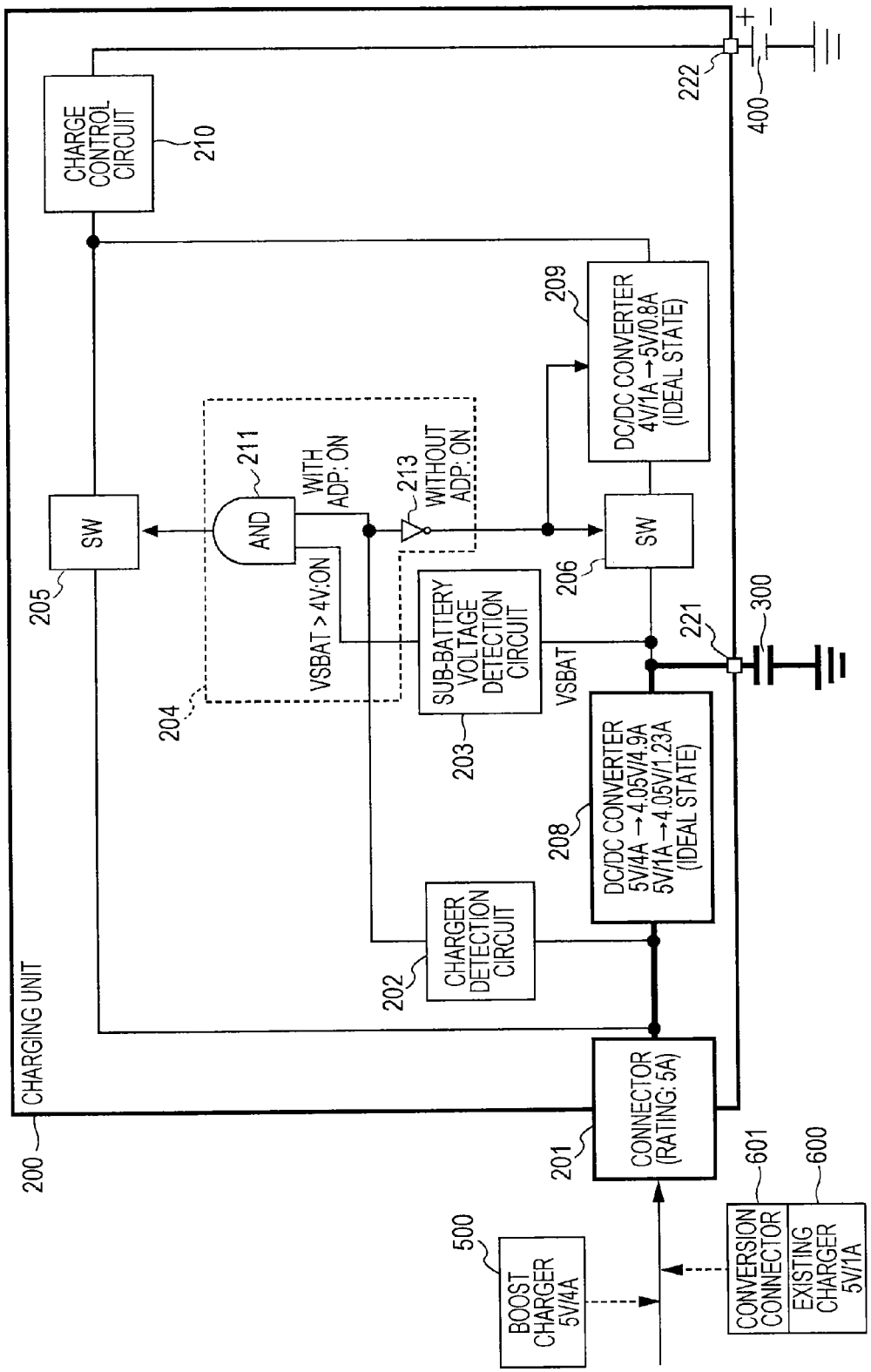
FIG. 5 is a diagram illustrating a modification in a first embodiment of the present disclosure.

FIG. 5 illustrates a modification in the first embodiment. As described above, the boost charger 500 can be connected to the connector 201. Even if users do not have such a boost charger 500, charging can be desirably performed with an existing charger 600 not intended for boost charge. Accordingly, a conversion connector (or a conversion cable) 601 is inserted as an adapter for the existing charger 600 so that the existing charger 600 can be connected to the connector 201. Herein, when the boost charger 500 and the existing charger 600 are not particularly discriminated from one another, the boost charger 500 and the existing charger 600 are simply referred to as a "charger". The second DC/DC converter 208 converts 5 V/1 A into 4.05 V/1.23 A in an ideal state when the existing charger 600 is connected to the connector 201. Other configuration and operation are the same as those of the first embodiment.

Input/output characteristics of each DC/DC converter indicate that charging quicker than charging of the main battery 400 is performed even when the existing charger 600 is connected.

In accordance with this modification, since the existing charger 600 can be connected to the connector 201 using the conversion cable or the conversion connector, cost performance is good.

Second Embodiment

In the first embodiment, the configuration of mounting both of the sub battery 300 and the main battery 400 in the mobile device has been illustrated. In contrast, a second embodiment targets at a case in which a user selects and uses one of a boost charge battery used as the sub battery 300 and a normal battery used as the main battery 400.

Configuration and Operation of Second Embodiment

Figure 6:
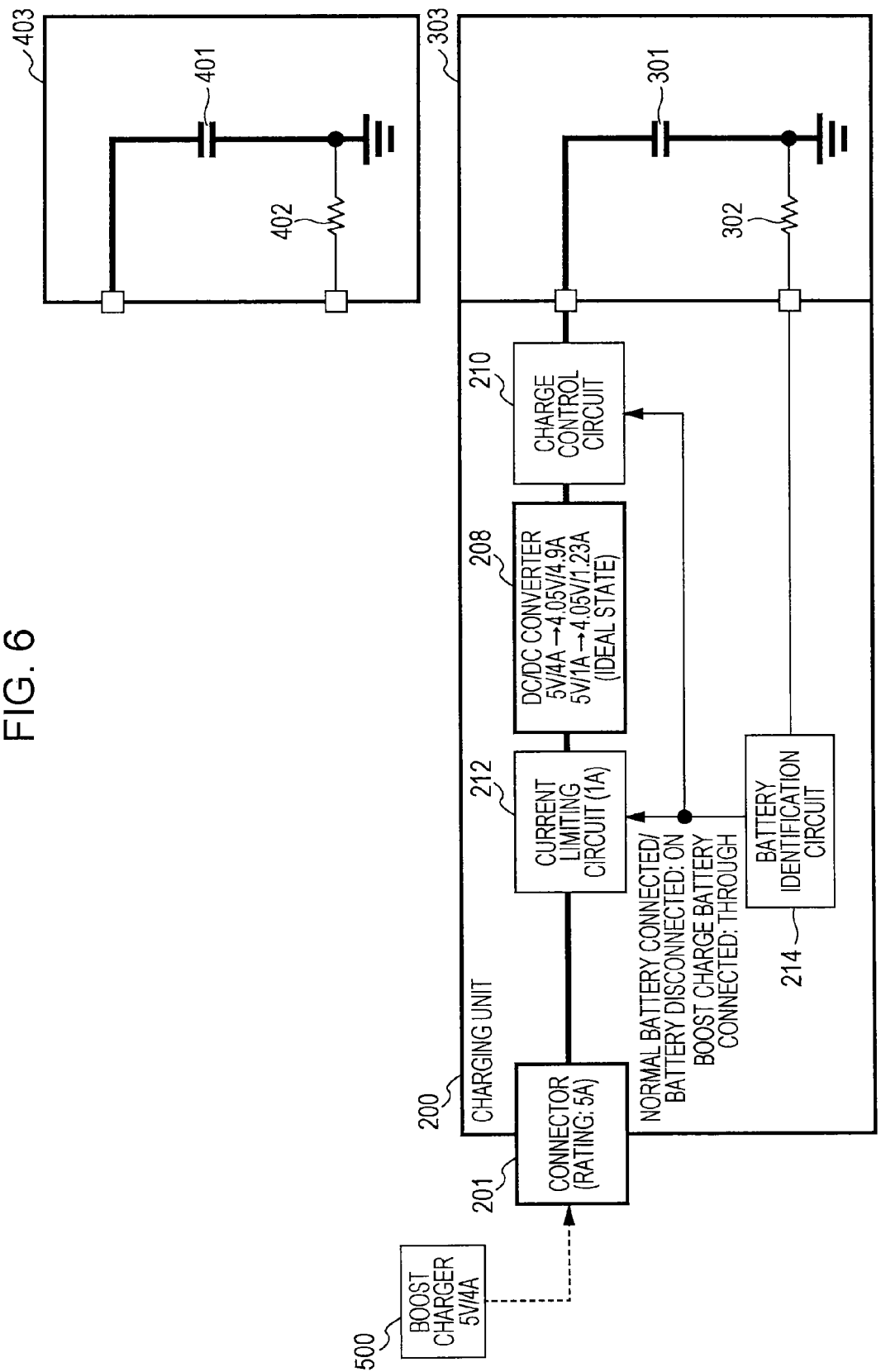
FIG. 6 is a diagram illustrating an example of a configuration of a charging unit in a second embodiment of the present disclosure.

A configuration of a charging unit 200 of the second embodiment will be described using FIG. 6. In FIG. 6, components similar to those illustrated in FIG. 2 are represented by the same reference numerals.

Similarly to the first embodiment, a boost charger 500 is connected to a connector 201.

A second battery unit 303 including a boost charge battery 301 and a first battery unit 403 including a normal battery 401 are configured to be exchangeably attached to and removed from the charging unit 200 of a mobile device. The battery unit 303 includes the boost charge battery 301 and a battery identification resistor 302. The battery unit 403 includes the normal battery 401 and a battery identification resistor 402. The boost charge battery 301 corresponds to the sub battery 300 in the first embodiment. The normal battery 401 corresponds to the main battery 400 in the first embodiment. One end of each of the battery identification resistors 302 and 402 is grounded, whereas it is configured that the other end is connected to a battery identification circuit 214 when the battery unit is attached to the mobile device. Resistance values of the battery identification resistors 302 and 402 are set to be different.

The charging unit 200 includes the connector 201, the battery identification circuit 214, a current limiting circuit 212, a DC/DC converter 208, and a charge control circuit 210.

The battery identification circuit 214 is a circuit for identifying whether the boost charge battery 301 is currently connected to the charging unit 200 or the normal battery 401 is connected (or nothing is connected). More specifically, the battery identifying circuit 214 detects a difference between the resistance values of the battery identification resistors 302 and 402 to determine a state (a first state) in which the boost charge battery 301 is connected or a state (a second state) in which the normal battery 401 is connected (or no battery is connected). When the output of the battery identification circuit 214 indicates connection of the normal battery 401 (or connection of no battery), the current limiting circuit 212 operates (ON) to protect the normal battery 401 so that overcurrent does not flow therethrough. In the illustrated example, a limit current value is set to 1 A. When the output of the battery identification circuit 214 indicates connection of the boost charge battery 301, the current limiting circuit 212 let the current flow therethrough (that is, does not perform the current limitation).

Similarly to the first embodiment, the DC/DC converter 208 converts electric power from the charger connected to the connector 201 into an optimum level for performing charging of the boost charge battery 301 or the normal battery 401.

The charge control circuit 210 operates when the output of the battery identification circuit 214 indicates connection of the normal battery 401 (or connection of no battery). Operation contents thereof are similar to those of the first embodiment.

In such a configuration, when the boost charger 500 is connected to the connector 201, the charging unit 200 identifies whether the attached battery is the boost charge battery 301 or the normal battery 401, or no battery is connected by detecting the battery identification resistance value of the attached battery with the battery identification circuit 214.

If the attached battery is the boost charge battery 301, the charging unit 200 operates only the DC/DC converter 208 by bypassing (letting the current pass through) the current limiting circuit 212 and the charge control circuit 210 to perform charging of the boost charge battery 301.

In contrast, if the attached battery is the normal battery 401, the charging unit 200 turns ON the current limiting circuit 212 and the charge control circuit 210 to perform charging of the normal battery 401 while protecting the battery.

Figure 7:
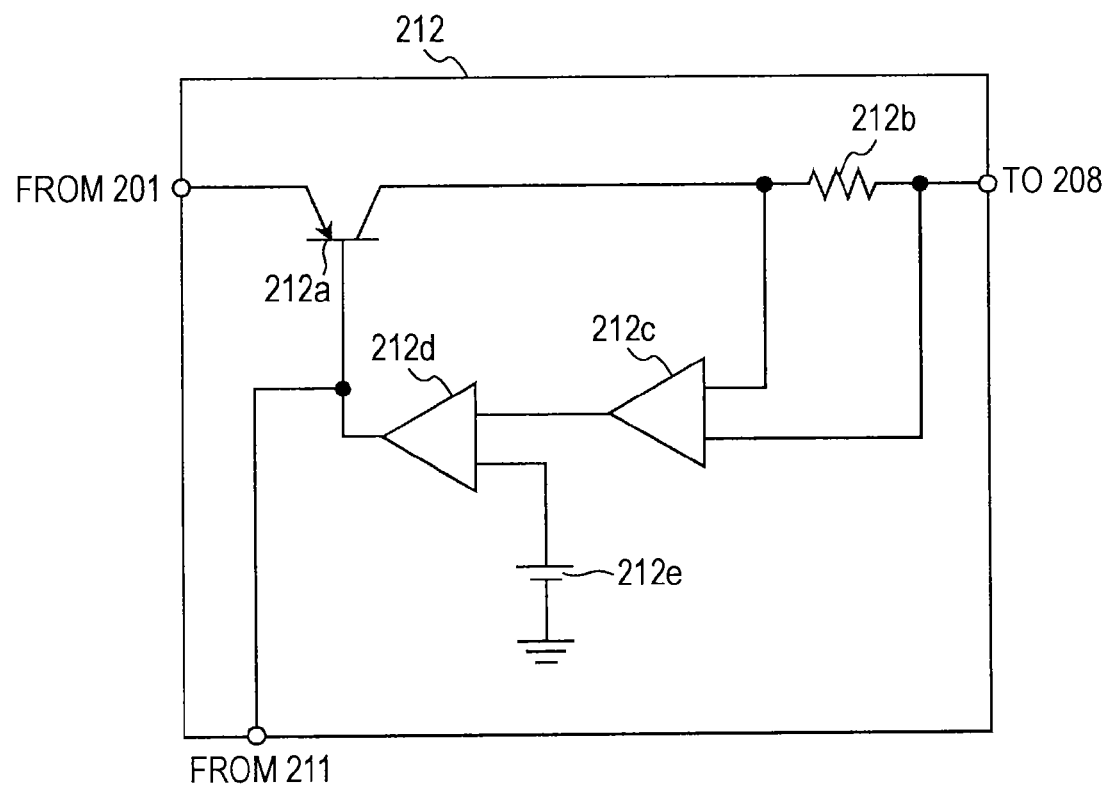
FIG. 7 is a diagram illustrating an example of a configuration of a current limiting circuit in FIG. 6.

FIG. 7 illustrates an example of a configuration of the current limiting circuit 212. The current limiting circuit 212 includes a transistor 212a operating as a current control element, a resistor 212b for current detection, a differential amplifier 212c, a reference voltage source 212e, and a comparator 212d. Output of a switch 205 is connected to an emitter of the transistor 212a, whereas a collector is connected to one end of the resistor 212b. The other end of the resistor 212b is connected to an input end of the DC/DC converter 208. Output of the comparator 212d and output of the battery identification circuit 214 are applied to a base of the transistor 212a. When current flowing through the resistor 212b exceeds a predetermined current value, the current limiting circuit 212 increases base potential of the transistor 212a to limit the current so that the current does not exceed the predetermined current value. In contrast, when the boost charge battery 301 is connected, the current limiting circuit 212 compulsorily sets the base potential of the transistor 212a at a low level by the output of the battery identification circuit 214 regardless of the output of the differential amplifier 212c to cancel an ON-state of the transistor 212a, i.e., limitation of the current, and shifts into a through state.

Advantages of Second Embodiment (1) One of the battery unit 403 including the battery unit 403 of the normal battery and the battery unit 303 including the boost charge battery 301 can be selectively attached to the mobile device 100. By temporarily mounting only one of the battery units, reduction in size and weight of the mobile device 100 can be expected.

(2) Charging of both of the normal battery 401 and the boost charge battery 301 can be performed with the same boost charger 500. Additionally, since the current limiting circuit 212 appropriately operates even if the boost charger 500 is connected in use of the normal battery 401, the normal battery 401 can be used safely.

(3) If users charge boost-chargeable battery unit 303 in a short period and carry the battery unit 303 as a backup battery unit, the users can extend uptime by performing exchanging from the battery unit 403 to the battery unit 303 before or after the remaining battery level of the battery unit 403 becomes empty.

Modification of Second Embodiment

Figure 8:
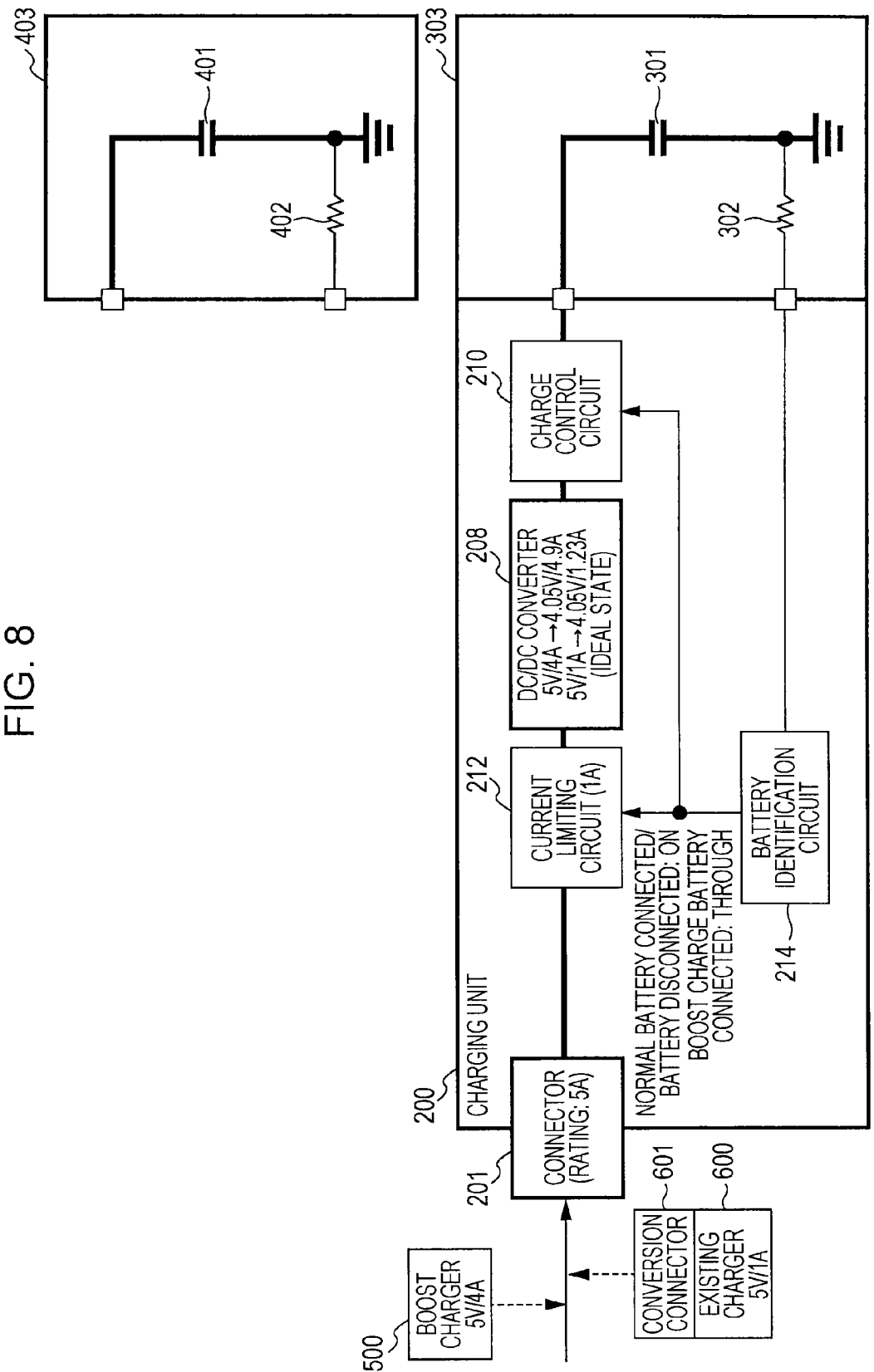
FIG. 8 is a diagram illustrating a modification in the second embodiment of the present disclosure.

FIG. 8 illustrates a modification in the second embodiment. In the second embodiment, charging is desirably performed with an existing charger 600 not intended for boost charge even if users do not have the boost charger 500. Accordingly, a conversion connector (or a conversion cable) 601 is inserted as an adapter for the existing charger 600 so that the existing charger 600 can be connected to the connector 201. The second DC/DC converter 208 converts 5 V/1 A into 4.05 V/1.23 A in an ideal state when the existing charger 600 is connected to the connector 201. Other configuration and operation are the same as those of the second embodiment. In accordance with this modification, since the existing charger 600 can be connected to the connector 201 using the conversion cable or the conversion connector, cost performance is good.

Modification of Second Embodiment

Figure 9:
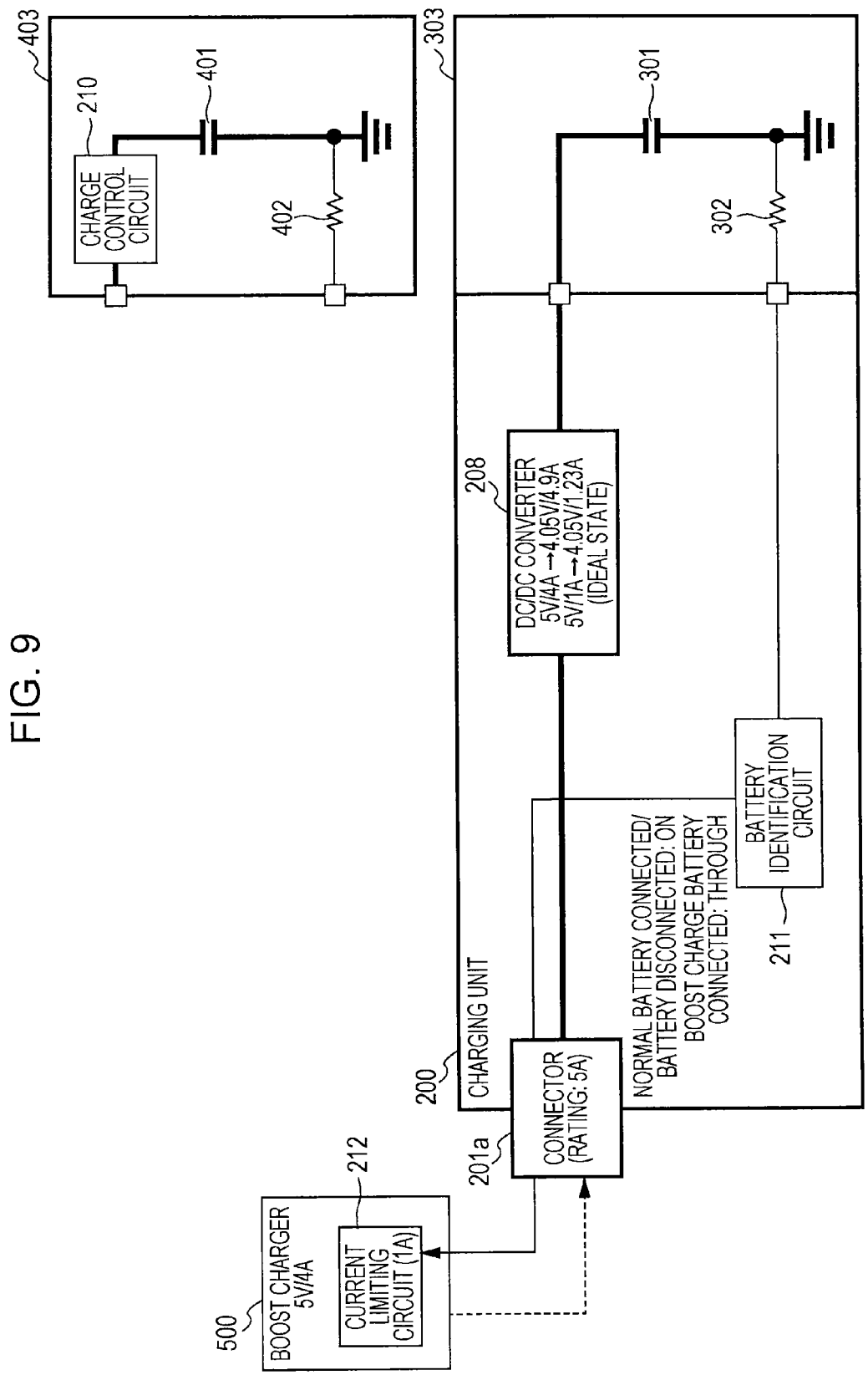
FIG. 9 is a diagram illustrating a configuration of a modification of the second embodiment of the present disclosure.

FIG. 9 illustrates a configuration of a modification of the second embodiment illustrated in FIG. 6. In FIG. 9, components similar to those illustrated in FIG. 6 are represented by the same reference numerals to omit a redundant description.

In this modification, the current limiting circuit 212 disposed in the charging unit 200 in FIG. 6 is included in the external boost charger 500.

The battery identification circuit 211 transmits a battery identification signal, i.e., output thereof, to the boost charger 500 through a connector 201a. In this way, the current limiting circuit 212 can be mounted on the boost charger 500 side and charging suitable for the attached battery can be performed. In addition, the mobile device 100 can be downsized. Furthermore, although the current limiting circuit 212 serves as a heat generation source, the heat generation source can be advantageously moved outside the mobile device 100 (in the boost charger 500) in accordance with this modification.

Moreover, in the configuration of FIG. 9, the charge control circuit 210 is removed from the charging unit 200 and is included in the battery unit 403 of the normal battery 401. This configuration is advantageous in downsizing the mobile device 100.

Modification of Configuration of FIG. 9

Figure 10:
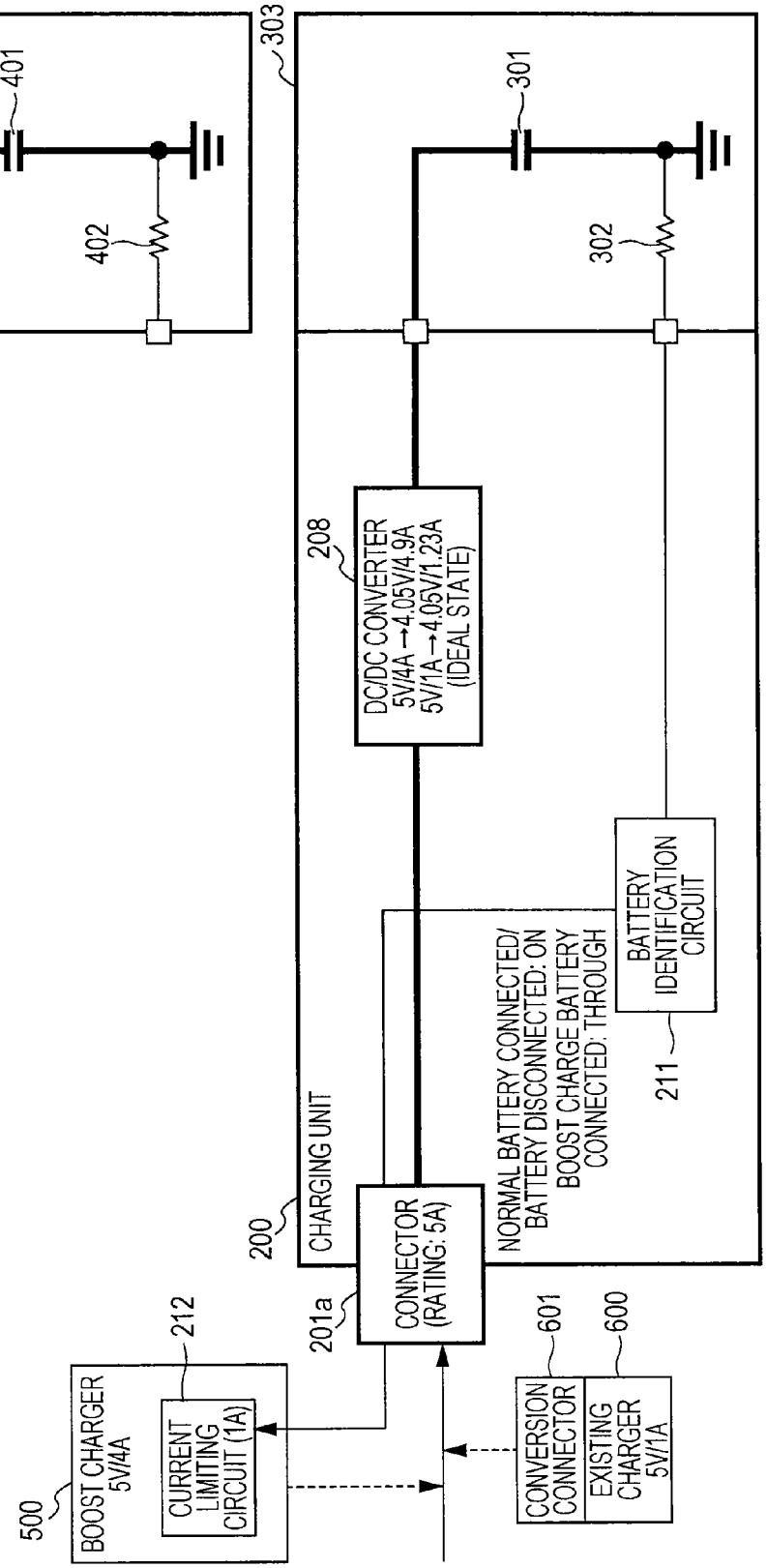
FIG. 10 is a diagram illustrating a modification allowing the configuration of FIG. 9 to support an existing charger.

FIG. 10 illustrates a modification of the configuration of FIG. 9. As illustrated in FIG. 10, a conversion connector (or a conversion cable) 601 is inserted as an adapter so that the existing charger 600 can be connected to the connector 201a the connector 201. In such a case, electric power conversion of the DC/DC converter 208 is from 5 V/1 A to 4.05 V/1.23 A in this example.

Third Embodiment

Each of the mobile devices of the first and second embodiments performs charging in a contact state. In contrast, a third embodiment targets at a configuration of a mobile device supporting a non-contact charger.

Configuration of Third Embodiment

Figure 11:
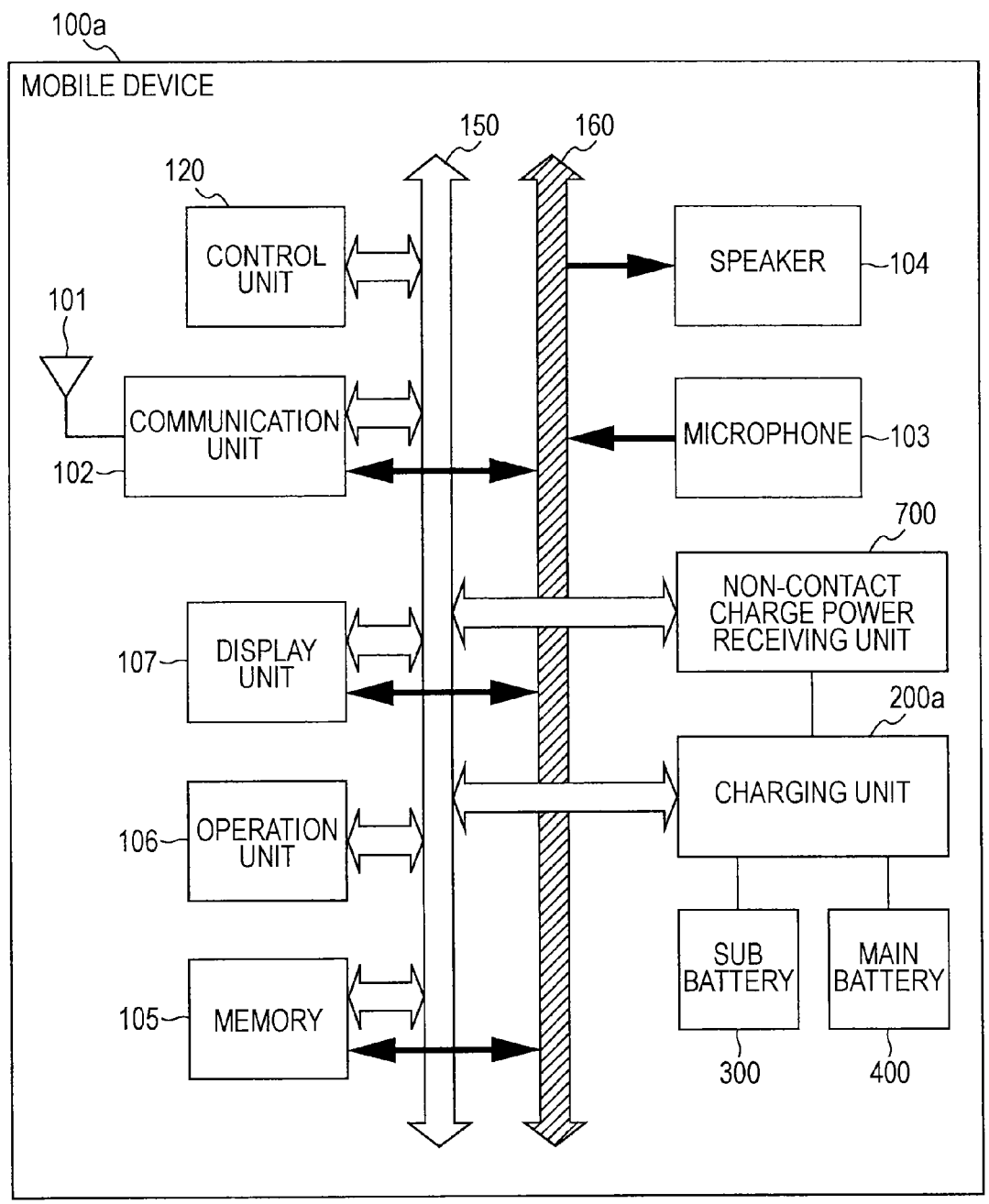
FIG. 11 is a block diagram representing a hardware configuration of a mobile device supporting non-contact charging in a third embodiment of the present disclosure.

FIG. 11 is a block diagram representing a hardware configuration of a mobile device 100a supporting non-contact charging in the third embodiment. Components similar to those of the mobile device 100 illustrated in FIG. 1 are represented by the same reference numerals to omit a redundant description.

A component added in the third embodiment is a non-contact charge power receiving unit 700 connected to a charging unit 200a and a control line 150. At the time of non-contact charging from an external non-contact charge power transmitting unit (a transmission side), this non-contact charge power receiving unit 700 is a part that receives electric power from the transmission side and controls data communication with the transmission side. Although various methods, such as load modulation/frequency modulation or other wireless communication, e.g., IrDA and NFC, can be considered as data communication configurations between the non-contact charge power receiving unit 700 and the non-contact charge power transmitting unit, any method can be adopted.

Figure 12:
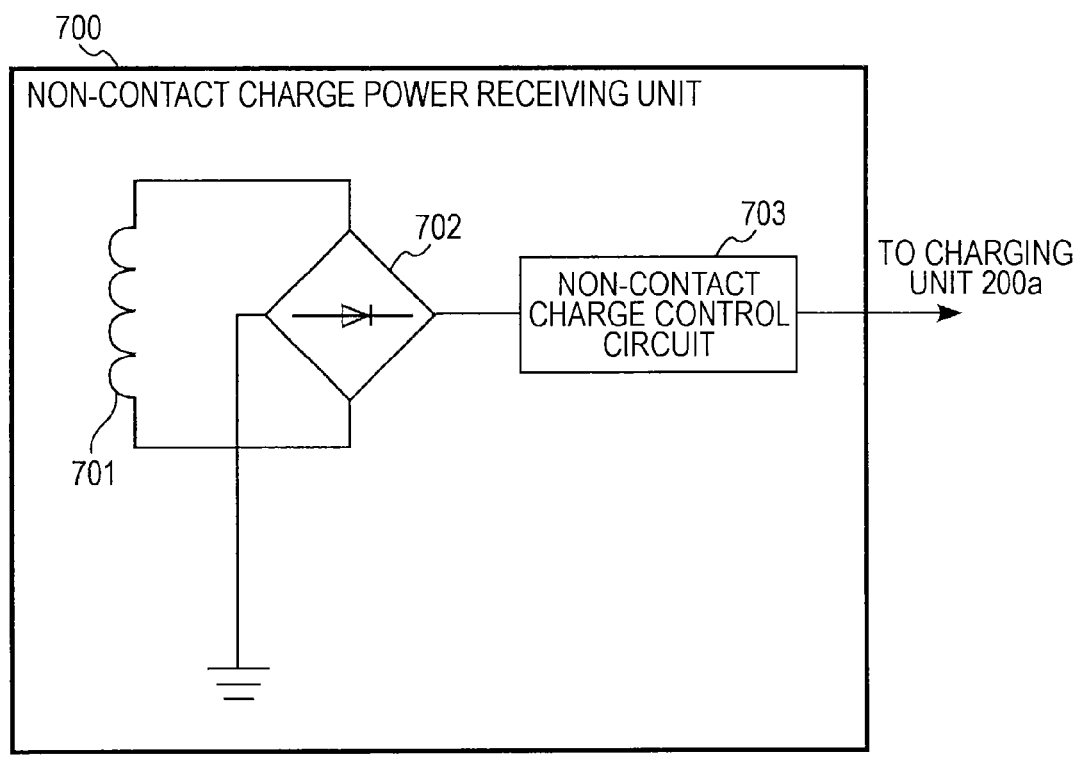
FIG. 12 is a diagram illustrating an example of an internal configuration of a non-contact charge power receiving unit in FIG. 11.

FIG. 12 illustrates an example of an internal configuration of the non-contact charge power receiving unit 700.

The non-contact charge power receiving unit 700 is constituted by a non-contact charge power receiving antenna 701, a rectifier circuit 702, and a non-contact charge control circuit 703. The non-contact charge power receiving antenna 701 is an antenna that receives electric power transmitted from a non-contact charge power transmitting antenna (not illustrated) on the transmission side. The rectifier circuit 702 is a circuit that rectifies alternating-current power received by the non-contact charge power receiving antenna 701. The non-contact charge control circuit 703 is a regulator circuit for connecting output of the rectifier circuit 702 to the charging unit 200a and a circuit for performing control of communication with the transmission side.

Furthermore, in the third embodiment, data communication is performed from the non-contact charge power receiving unit 700 toward a non-contact charge power transmitting unit 710 so that the receiving side can request the transmission side to transmit desired transmission electric power (transmission electric power in two steps, i.e., high and low, in this embodiment).

Figure 13:
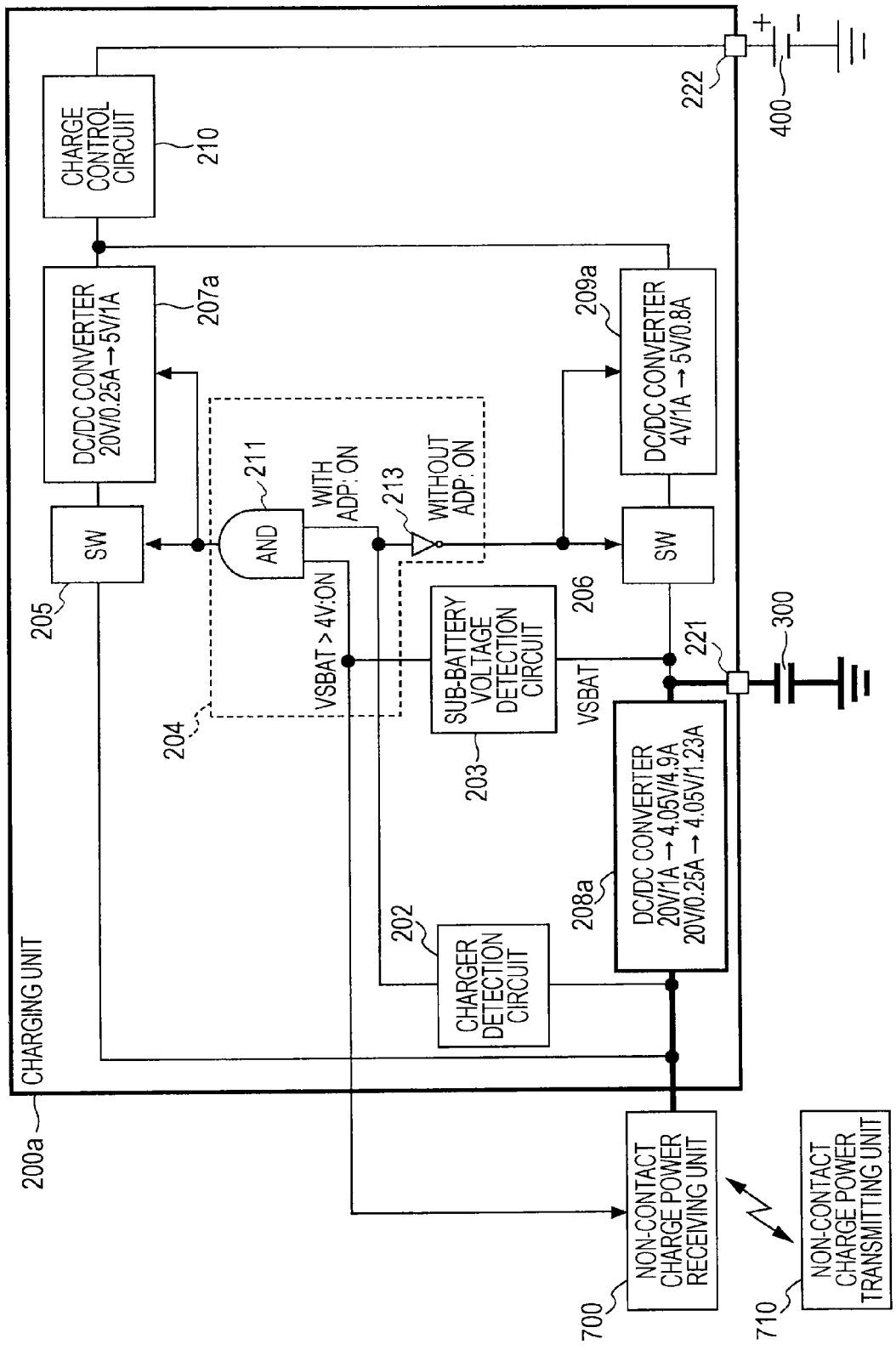
FIG. 13 is a diagram illustrating an example of a configuration of a charging unit supporting the non-contact charging in FIG. 11.

A configuration of the charging unit 200a supporting non-contact charging will be described next using FIG. 13. In FIG. 13, components similar to those illustrated in FIG. 2 are represented by the same reference numerals to omit a redundant description.

The configuration of FIG. 13 is about the same as that of FIG. 2. A difference is that the connector 201 and the boost charger 500 or the existing charger 600 connected to the connector 201 are replaced with the non-contact charge power receiving unit 700. A sub-battery voltage detection circuit 203 is connected to the non-contact charge power receiving unit 700. The non-contact charge power receiving unit 700 receives electric power from the external non-contact charge power transmitting unit 710.

Additionally, a DC/DC converter 207a is a step-down DC/DC converter that converts 20 V/0.25 A into 5 V/1 A in this example. A DC/DC converter 208a is a step-down DC/DC converter that converts 20 V/1 A into 4.05 V/4.9 A or 20 V/0.25 A into 4.05 V/1.23 A in accordance with output of the sub-battery voltage detection circuit 203. A DC/DC converter 209a is a step-up DC/DC converter that converts 4 V/1 A into 5 V/0.8 A.

Description of Operation of Third Embodiment

Figure 14:
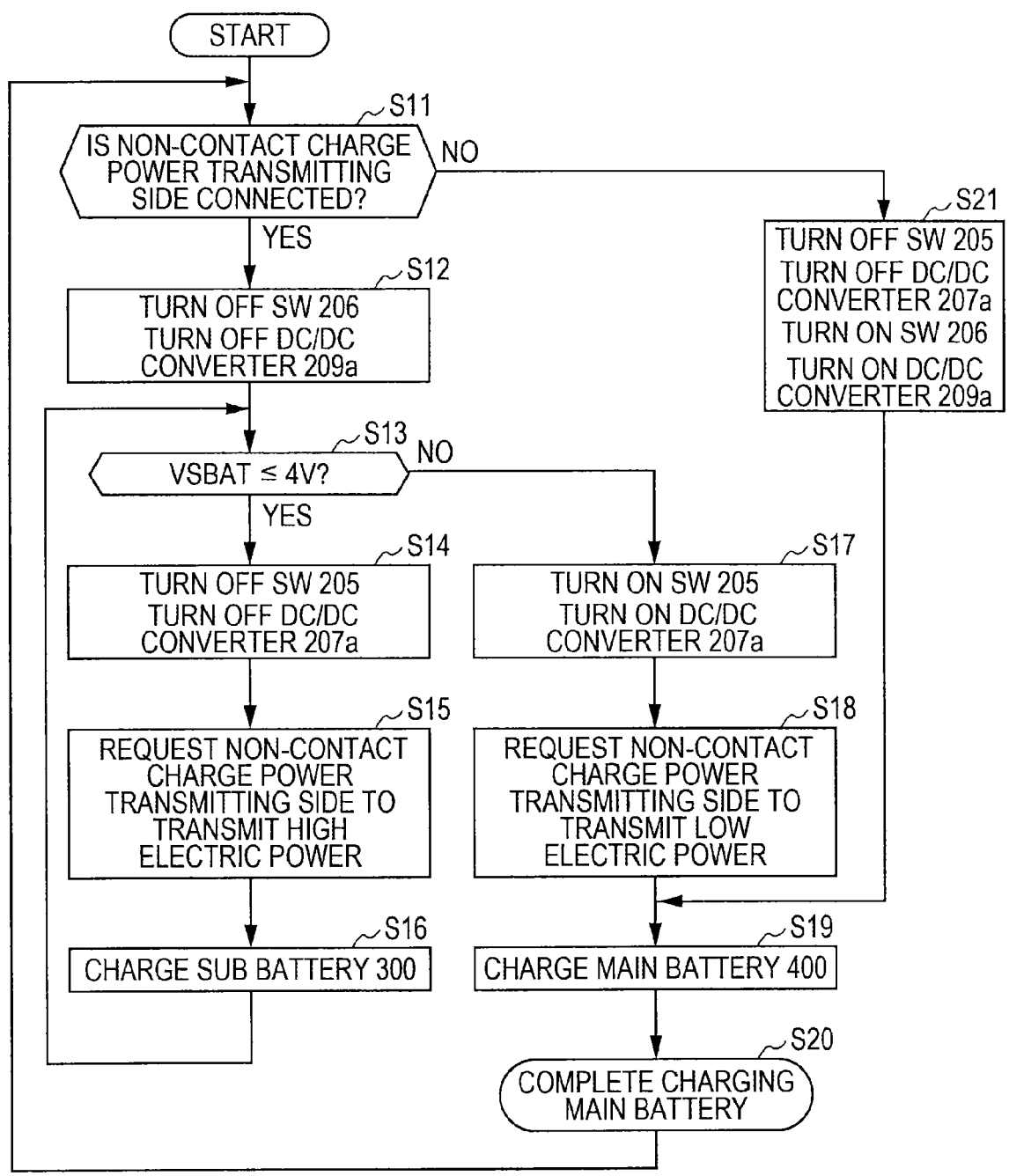
FIG. 14 is a flowchart representing an operation of the charging unit in FIG. 11.

FIG. 14 is a diagram illustrating, as a flowchart, an operation of the charging unit 200a in the third embodiment. This processing is started after the transmission side confirms that the correct receiving side is connected, starts transmitting electric power, and terminates predetermined data communication and once the receiving side receives electric power.

First, a charger detection circuit 202 confirms whether the appropriate non-contact charge power transmission side (the non-contact charge power transmitting unit 710) is in a connected state, i.e., whether the transmission side exists near a mobile device (the non-contact charge power receiving unit 700) (S11).

If the charger detection circuit 202 detects that the transmission side is in the connected state, a SW 206 and the DC/DC converter 209a are turned OFF through an inverting circuit 213, whereby charging of a main battery 400 from a sub battery 300 is prevented (S12).

The sub-battery voltage detection circuit 203 then confirms whether voltage (VSBAT) of the sub battery 300 is lower than a threshold or not (S13). If the voltage (VSBAT) of the sub battery 300 is equal to or lower than the threshold, the SW 205 and the DC/DC converter 207a are turned OFF (S14). In this way, charging of the sub battery 300 from the charger is prioritized. The non-contact charge power receiving unit 700 performs data communication toward the non-contact charge power transmitting unit 710 to request the non-contract charge power transmitting unit 710 to perform transmission of high transmission power (20 V/1 A in this example) (S15). In this way, charging of the sub battery 300 is continuously performed until the voltage (VSBAT) of the sub battery 300 becomes higher than the threshold (S16).

Once the voltage (VSBAT) of the sub battery 300 becomes higher than the threshold thereafter, the SW 205 and the DC/DC converter 207a are turned ON (S17). The non-contact charge power receiving unit 700 performs data communication toward the non-contact charge power transmitting unit 710 to request the non-contact charge power transmitting unit 710 to perform transmission of low transmission power (20 V/0.25 A in this example) (S18). Charging of the main battery 400 is performed from the non-contact charge power receiving unit 700 through a charge control unit 210 (S19). After charging of the main battery 400 completes (S20), the process returns to the first step of S11.

If it is determined in step S11 that the appropriate non-contact charge power transmitting unit 710 is not in the connected state, the SW 205 and the DC/DC converter 207a are turned OFF and a SW 206 and the DC/DC converter 209a are turned ON (S21). In this way, charging of the main battery 400 from the sub battery 300 is performed (S19).

FIG. 15 illustrates a relation between presence/absence of the charger and high/low voltage of the sub battery 300 and operations states (ON/OFF) of the SW 205, the DC/DC converter 207a, the SW 206, and the DC/DC converter 209a in the third embodiment.

FIG. 15 is a diagram representing, as a table, the operation represented by the flowchart of FIG. 11. That is, this table illustrates operation states (ON/OFF) of the switch SW 205, the DC/DC converter 207a, the switch SW 206, and the DC/DC converter 209a in accordance with presence/absence of the charger and high/low voltage of the sub battery 300.

Advantages of Third Embodiment (1) A connector 201 can be eliminated by the use of non-contact charging. Additionally, safety improves, such as elimination of a concern about external short-circuit of a power source.

(2) Optimum charge control can be performed by monitoring the voltage of the sub battery and changing the non-contact charge transmission power in accordance with a charge status.

Fourth Embodiment

In a fourth embodiment, the configuration of performing non-contact charging in the third embodiment illustrated in FIG. 13 is combined with the configuration of exchangeably attaching and removing the normal battery 401 and the boost charge battery 301 in the second embodiment described in FIG. 6.

Configuration of Fourth Embodiment

Figure 16:
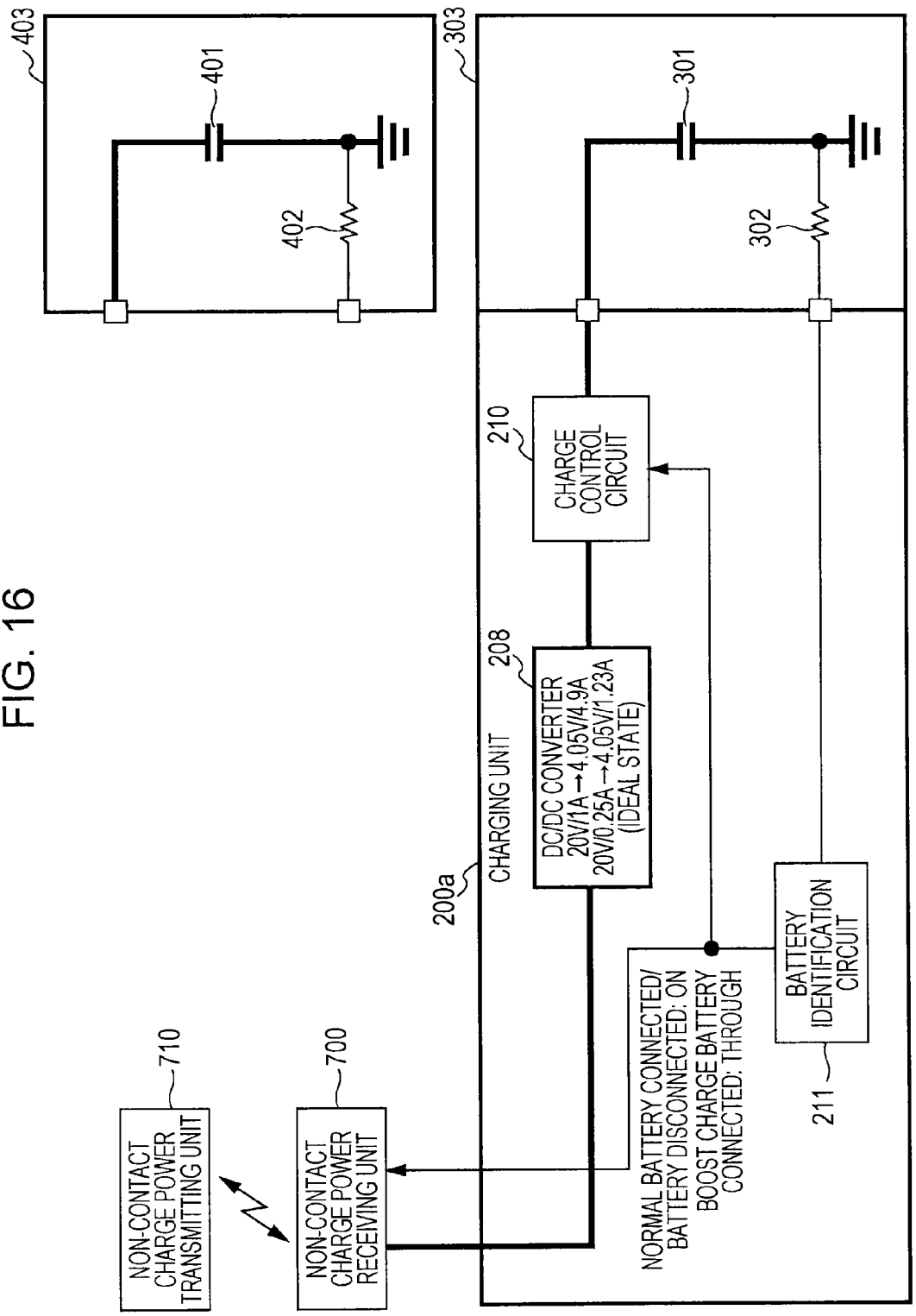
FIG. 16 is a diagram illustrating an example of a configuration of a charging unit in a fourth embodiment of the present disclosure.

A configuration of the fourth embodiment will be described using FIG. 16. The configuration of FIG. 16 is about the same as that of FIG. 6 but the connector 201 and the boost charger 500 or the existing charger 600 connected to the connector 201 are replaced with a non-contact charge power receiving unit 700. In FIG. 16, components similar to those illustrated in FIG. 6 are represented by the same reference numerals to omit a redundant description.

Operation of Fourth Embodiment

As described above, a battery identification circuit 214 identifies whether a boost charge battery 301 is currently connected to a charging unit 200a or a normal battery 401 is connected (or no battery is connected). The detected signal is input to a non-contact charge control circuit 703 (FIG. 12) disposed in a non-contact charge power receiving unit 700. The non-contact charge control circuit 703 informs a non-contact charge power transmitting unit 710 (a transmission side) of a kind of the connected battery via data communication. If the connected battery is the boost charge battery 301, the non-contact charge power transmitting unit 710 increases transmission electric power to transmit electric power suitable for the kind of the connected battery.

Advantages of Fourth Embodiment (1) Although two kinds of batteries are mounted in a mobile device 100 at the same time in the third embodiment, the use of the fourth embodiment allows one of a battery unit 403 including a normal battery 401 and a battery unit 303 including the boost charge battery 301 to be selectively attached in the mobile device 100. By temporarily mounting only one of the battery units, reduction in size and weight of the mobile device 100 can be expected.

(2) Charging can be performed on each of the normal battery 401 and the boost charge battery 301 with the same non-contact charge power transmitting unit 710. Additionally, since the transmission electric power of non-contact charging is optimized even in the use of the normal battery 401, the normal battery 401 can be used safely.

(3) If users charge boost-chargeable battery unit 303 in a short period and carry the battery unit 303 as a backup battery unit, the users can extend uptime by performing exchanging from the battery unit 403 to the battery unit 303 before or after the remaining battery level of the battery unit 403 becomes empty.

Modification of Configuration of FIG. 16

Figure 17:
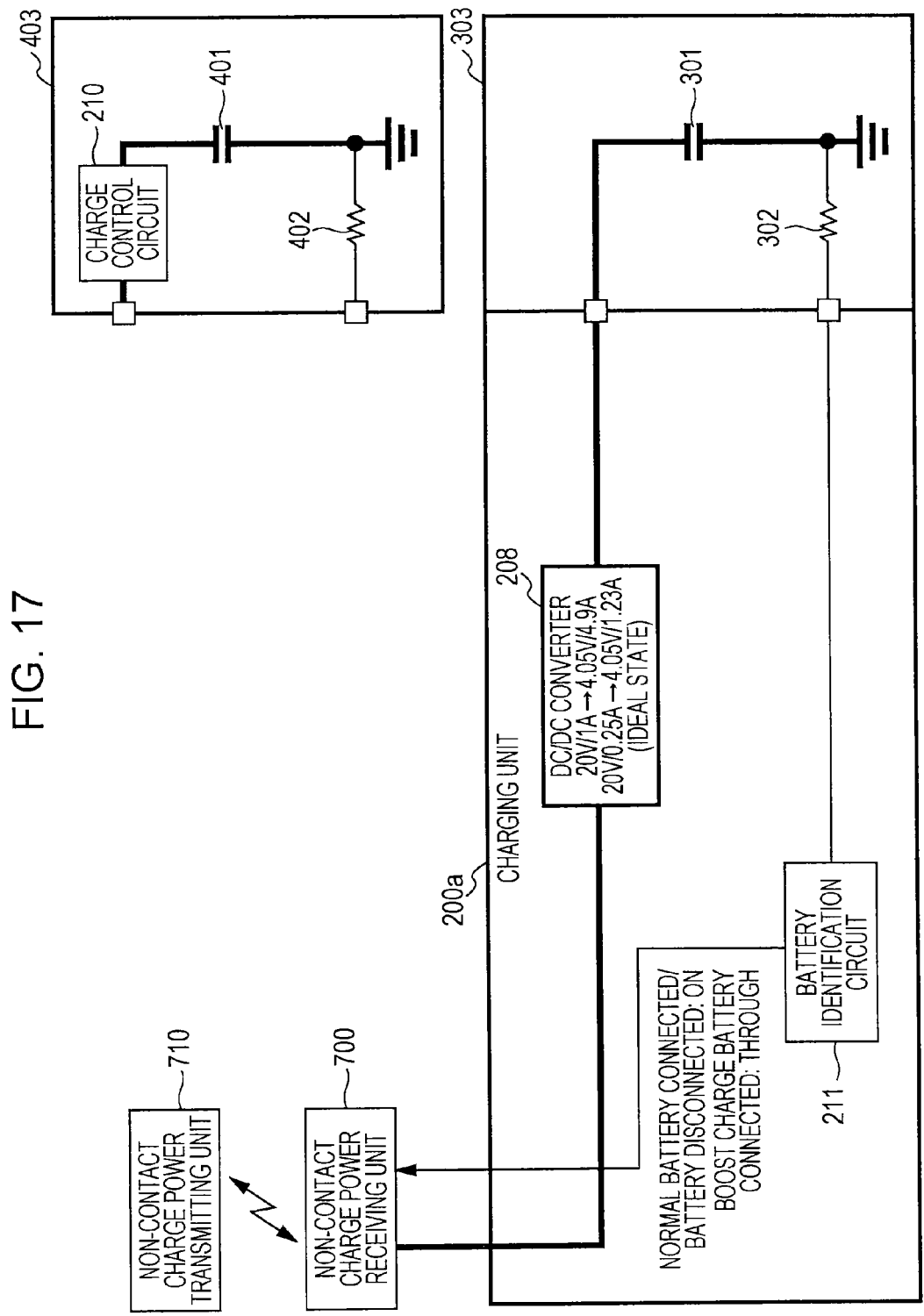
FIG. 17 is a diagram illustrating a modification of the configuration illustrated in FIG. 16.

FIG. 17 illustrates a modification of the configuration illustrated in FIG. 16. In FIG. 17, components similar to those illustrated in FIG. 16 are represented by the same reference numerals to omit a redundant description. In the configuration of FIG. 17, a charge control circuit 210, the charge control circuit 210 is removed from a charging unit 200a and is included in the battery unit 403 of the normal battery 401. This configuration is advantageous in downsizing of the mobile device 100.

Still Other Modifications

Although the preferred embodiments have been described above, various alterations and modifications can be made other than those mentioned above. That is, it should be naturally understood by those skilled in the art that various modifications, combinations, and other embodiments may occur depending on design or other factors as long as they are within a range of claims or equivalence of the claims.

For example, although transmission power is controlled depending on the kind of the battery in a binary manner, i.e., high and low, in the embodiments adopting non-contact charging, the non-contact charge control circuit 703 may grasp a capacity of the connected battery and informs the transmission side of the battery capacity, whereby desired charge power (charge current) can be obtained.

Although the mobile phone terminal has been described as an example of the mobile device, the present disclosure can be applied to given mobile devices using secondary batteries, such as a game platform, a digital camera, a small PC, a music player, and a video player.

The invention claimed is:

1. A charging device that is selectively connected to one of a first battery that is charged at a first rate and a second battery that is charged at a second rate, which is faster than the first rate, the charging device comprising:
   an interface that receives electric power from a charger;
   a connector that is selectively connected to the first battery or the second battery;
   a battery identification circuit that determines whether the first or second battery is connected to the connector; and
   a current limiting circuit disposed between the interface and the connector and that limits a current of power received from the charger to a predetermined value when the battery identification circuit determines that the first battery is connected to the connector, wherein
   the interface is a non-contact charge power unit and the charger is a non-contact charge power transmitter, and
   the non-contact charge power unit transmits data controlling a level of power transmitted by the non-contact charge power transmitter based on the determination by the battery identification circuit.

2. The charging device of claim 1, wherein
   the current limiting circuit does not limit the current of power received from the charger when the battery identification circuit determines that the second battery is connected to the connector.

3. The charging device of claim 1, further comprising:
   a direct current/direct current (DC/DC) converter disposed between the interface and the connector.

4. The charging device of claim 3, wherein
   the DC/DC converter converts electric power received from the charger to an optimum level for charging the first battery when the battery identification circuit determines that the first battery is connected to the second connector.

5. The charging device of claim 3, wherein
   the DC/DC converter converts electric power received from the charger to an optimum level for charging the second battery when the battery identification circuit determines that the second battery is connected to the connector.

6. The charging device of claim 1, further comprising:
   a charge control circuit disposed between the current limiting circuit and the connector that controls charging the first battery when the battery identification circuit determines that the first battery is connected to the connector.

7. The charging device of claim 1, wherein
   the battery identification circuit determines whether the first or second battery is connected to the connector based on a detected resistance value of a battery connected to the connector.

* * * * *